United States Patent
Helldörfer

(12) 
(10) Patent No.: US 6,403,917 B1
(45) Date of Patent: Jun. 11, 2002

(54) WELDING HEAD FOR A LOOPING MACHINE

(75) Inventor: Stefan Helldörfer, Pegnitz (DE)

(73) Assignee: SMB Schwede Maschinenbau GmbH, Goldronach (DE)

( * ) Notice: Subject to any disclaimer, the term of this patent is extended or adjusted under 35 U.S.C. 154(b) by 56 days.

(21) Appl. No.: 09/684,324

(22) Filed: Oct. 10, 2000

(30) Foreign Application Priority Data

Oct. 8, 1999 (DE) .................................. 199 48 880

(51) Int. Cl.[7] .............................................. B23K 26/20
(52) U.S. Cl. .................................................. 219/121.63
(58) Field of Search ....................... 219/121.63, 121.64, 219/121.76, 121.82

(56) References Cited

U.S. PATENT DOCUMENTS

| | | | |
|---|---|---|---|
| 3,316,687 A | | 5/1967 | Bartlett |
| 3,442,732 A | | 5/1969 | Stensaker et al. |
| 3,749,622 A | | 7/1973 | Sato et al. |
| 5,182,428 A | * | 1/1993 | Jack et al. ............. 219/121.63 |
| 6,053,387 A | | 4/2000 | Garbotz et al. |
| 6,312,198 B1 | * | 11/2001 | Van Vliet et al. ........ 405/302.7 |

FOREIGN PATENT DOCUMENTS

| | | |
|---|---|---|
| DE | 1958430 | 5/1971 |
| DE | 24 53 999 | 5/1976 |
| DE | 3805353 C1 | 8/1989 |
| DE | 3842074 A1 | 6/1990 |
| DE | 4233159 A1 | 4/1994 |
| DE | 4313270 A1 | 10/1994 |
| DE | 19632625 A1 | 2/1998 |
| DE | 19828244 A1 | 1/1999 |
| EP | 0 720 948 A1 | 7/1996 |

OTHER PUBLICATIONS

"Neuland Beschreiten", Christoph Ullmann und Volker Krause, Koblenz, Oct. 1998.

* cited by examiner

*Primary Examiner*—Samuel M. Heinrich
(74) *Attorney, Agent, or Firm*—Browdy and Neimark

(57) ABSTRACT

A welding head for a looping machine comprises
- a bearing housing;
- several clamping jaws for fixing and actuating the leading strap section and the strap section lapping there-over during withdrawal and welding of the looping strap;
- a pressure plate on the upper side of the welding head, acting as a holder upon actuation of the leading strap section and the strap section lapping there-over during the welding job; and
- a welding device in the welding head for welding together the leading strap section and the strap section lapping there-over.

The welding device is a laser beam welding device which, in the welding head, acts on the strap sections to be welded together.

10 Claims, 2 Drawing Sheets

WELDING HEAD FOR A LOOPING MACHINE

BACKGROUND OF THE INVENTION

1. Field of the Invention

The invention relates to a welding head for a looping machine comprising a bearing housing; several clamping jaws for fixing and actuating the leading strap section and the strap section lapping there-over during withdrawal and welding of the looping strap; a pressure plate on the upper side of the welding head, acting as a holder upon actuation of the leading strap section and the strap section lapping there-over during the welding job; and a welding device in the welding head for welding together the leading strap section and the strap section lapping there-over.

2. Background Art

A welding head of the generic type is known for example from DE 297 16 897 U1. Generally, welding heads of this type with welding tongues which become hot are conventional in the field of looping machines and have been used for years among others also by Applicant. In this case, several clamping jaws are provided, which are disposed one after the other in the strap running direction and are guided for displacement crosswise of the plane of the strap, serving to fix and actuate the looping strap. The clamping jaws are moved into their respective position by a cam disk control system.

The welding head further comprises a pressure plate which is guided for displacement in parallel to the looping plane and crosswise of the strap running direction; it is provided on the upper side of the welding head as a holder upon actuation of the leading section of the strap and the overlapping strap section during welding. A welding tongue to be inserted between the strap layers that are to be welded together is guided on the bearing housing in parallel to the pressure plate.

These prior art welding tongues pose the problem that the motion of insertion and deflection of the welding tongue into, and out of, its respective position must be controlled by a comparatively complicated mechanism.

On the one hand this is accompanied with complex mechanical and constructional implementation which negatively affects the cycle time that can be achieved by the welding head. On the other hand the welding tongue and its entire operating apparatus requires much space within the welding head, which means a fundamental drawback in the light of the multiplicity of movable components that are to be controlled in the welding head.

SUMMARY OF THE INVENTION

Proceeding from the prior art drawbacks, it is the object of the invention to improve the welding device of a welding head of the species such that a more compact design of the head itself and reliable welding of the looping strap are achievable by reduced mechanical requirements and less complicated implementation in terms of control technology during the manufacture and operation of the welding head.

This object is attained by the invention, according to which the welding device is a laser beam welding device which, in the welding head, acts on the strap sections to be welded together.

The invention implies a fundamental change in the kind of welding of the looping strap sections. While the prior art proceeds from a mechanical body which must be heated, directly contacting the strap sections to be welded together, the invention uses electromagnetic radiation in the form of laser beams. There is no longer any need of a mechanical component which is to be moved between the strap sections in a complicated way—as mentioned above. Rather, the strap sections can be exposed to the laser beams, melted and durably united by the pressure of the clamping jaws directly after the looping job once the loop of the strap has been severed from the strap supply.

In accordance with preferred embodiments of the invention, the laser radiation as such can be produced for example by laser diodes which are disposed in the clamping jaws or—if sufficient space is available—between these clamping jaws. Any complicated laser-optical guide elements can then be dropped. However, it is also conceivable to provide for a supply laser outside the clamping jaws within the welding head or at any other place of the looping machine and, via fiber-optical light guides, to supply the laser radiation to the strap sections to be welded together in the head. This may take place right through the clamping jaws or for instance via the pressure plate which serves as a holder.

Further details of the invention will become apparent from the ensuing description of exemplary embodiments, taken in conjunction with the annexed drawings.

DESCRIPTION OF THE PREFERRED EMBODIMENTS

Figure 1:
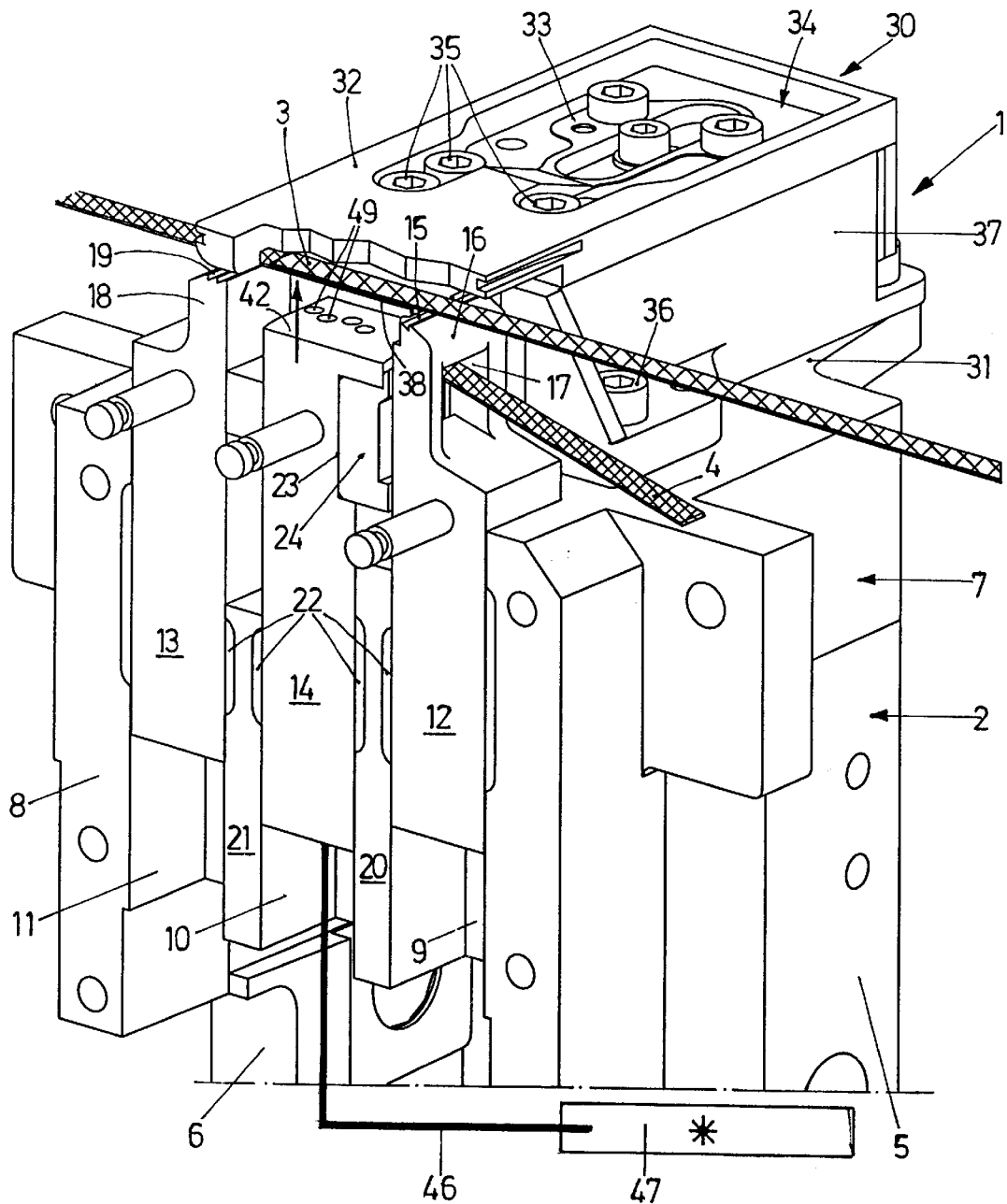
FIG. 1 is a perspective view of details of a welding head.

As seen in FIG. 1, a welding head—designated in its entirety by 1—for a looping machine (not shown) comprises a bearing housing 2 in the form of a cast ingot as a backbone of all functional components. The bearing housing 2 comprises a base plate (not shown), by means of which the bearing housing 2 is flanged for instance on a frame bar of the machine frame of the looping machine. Extending upwards from the base plate are two lateral supports 5, 6 which are molded in one piece thereon and on which the housing body 7 is integrally formed. The housing body 7 possesses corresponding receptacles and mountings for the other functional parts of the welding head, which will be specified in detail below.

As seen in particular in FIG. 1, separate guideways 9, 10, 11 for in each case one clamping jaw 12, 13, 14 of the welding head 1 are formed in an outside 8 of the housing body 7. The first clamping jaw 12 serves for fixing, in the welding head 1, the leading section 3 of a looping strap 4 that is inserted into the looping machine, when the strap 4 is withdrawn and tightened and when it is welded. In this case, the leading section 3 is fixed by a fluted clamping surface 15 on the head 16 which is narrowed as compared to the basic width of the clamping jaw 12. In this head 16, further provision is made for a window 17 through which passes the strand of strap inserted into the looping machine.

The second clamping jaw 13 serves for fixing the strap section that laps over the leading section when these two strap sections are welded together. In this clamping jaw 13 too, provision is made for a narrow head 18 with a fluted clamping surface 19.

The third clamping jaw 14 is disposed between the first and second clamping jaw 12, 13, serving for joint actuation of the leading strap section and the strap section lapping there-over when these two strap sections are welded together. Since the cooperation of the three clamping jaws 12, 13, 14 during insertion, withdrawal, welding and severing of the noose formed around a product to be looped takes place by analogy to the prior art, there is no need of a detailed description of these processes.

As regards the basic structure of the welding head 1, FIG. 1 further illustrates a pressure plate unit 30 which is built on a corresponding flange surface 31 on the upper side of the housing body 7. A detailed description will follow.

The structure of the clamping jaws 12, 13, 14 and their guideways 9, 10, 11 can also be seen in FIG. 1. The guideways 9, 10, 11 are formed by recesses in the housing body 7, the cross section of which corresponds to that of the clamping jaws 12, 13, 14 and which are separated from each other by ribs 20, 21 integrally molded on the cast ingot. Flat lubrication bore relieves 22 are integrated into the surfaces that laterally flank the clamping jaws 12, 13, 14 so as to ensure impeccable, nearly frictionless movement of the clamping jaws 12, 13, 14 in the guideways 9, 10, 11.

As seen in FIG. 1, the outside 8 of the housing body 7 and the corresponding sides of the clamping jaws 12, 13, 14 are in alignment. The housing body 7 with these guideways 9, 10, 11 and with the clamping jaws 12, 13, 14 is closed by a housing cover (not shown) which is screwed laterally onto the outside 8.

FIG. 1 further illustrates a cutter bar 24, which sits in a lateral recess 23 at the upper end of the central clamping jaws 14 above the corresponding rib 20 and which, by a cutting surface 25 and a slide surface 26, supports itself on the side, turned toward it, of the first clamping jaw 12. In the direction toward the first clamping jaw 12, the cutter bar 24 is actuated by a helical compression spring (not shown), which sits in two blind holes in the clamping jaw 14 and the cutter bar 24, respectively. The cutting surface 25 cooperates with the window 17 in the first clamping jaw 12, cutting through the strap 4, which runs through the window 17, upon a corresponding motion of the clamping jaw 12 relative to the clamping jaw 14 (together with the cutter bar 24).

The structure of the pressure plate unit 30 is explained, taken in conjunction with FIG. 1. The pressure plate 32 is fundamentally guided for displacement in parallel to the plane of the looping strap and crosswise of the strap running direction and disposed on the upper side of the welding head as a holder upon actuation of the leading end of the strap and the strap section lapping there-over during the welding job. The displaceability crosswise of the strap running direction is indispensable in order for the loop of the strap to be set free for discharge of the looped product once the strap has been welded and tightened. As a result of the crosswise displacement, the pressure plate is withdrawn from its position between the product to be looped and the noose of the looping strap.

Sliding guidance of the pressure plate 32 takes place by means of a substantially platy guide member 33, which is integrally molded on the pressure plate 32 and the upper side of which is provided with recesses 34 for some decrease in weight. This has a favorable effect on the forces and moments that occur upon acceleration of the pressure plate 32 during the lateral displacement, which helps obtain a reduction of wear.

A guide carriage (not shown) is mounted on the guide member 33 by means of screws 35, cooperating with the lower surface of the guide member 33 to form an externally open guiding groove. Guiding ribs of a guide support 37, which is mounted by screws 36 on the bearing housing 2 on the flange surface 31 of the housing body 7, engage with these guiding grooves from outside in the way of a groove and tongue assembly.

The virtual gist of the invention will be explained, taken in conjunction with FIGS. 2 and 3. They show in detail how to weld together the two overlapping strap sections i.e., the leading section 3 and the tail section 38 which has been severed from the supply of strap by means of the cutter bar 24.

Figure 2:
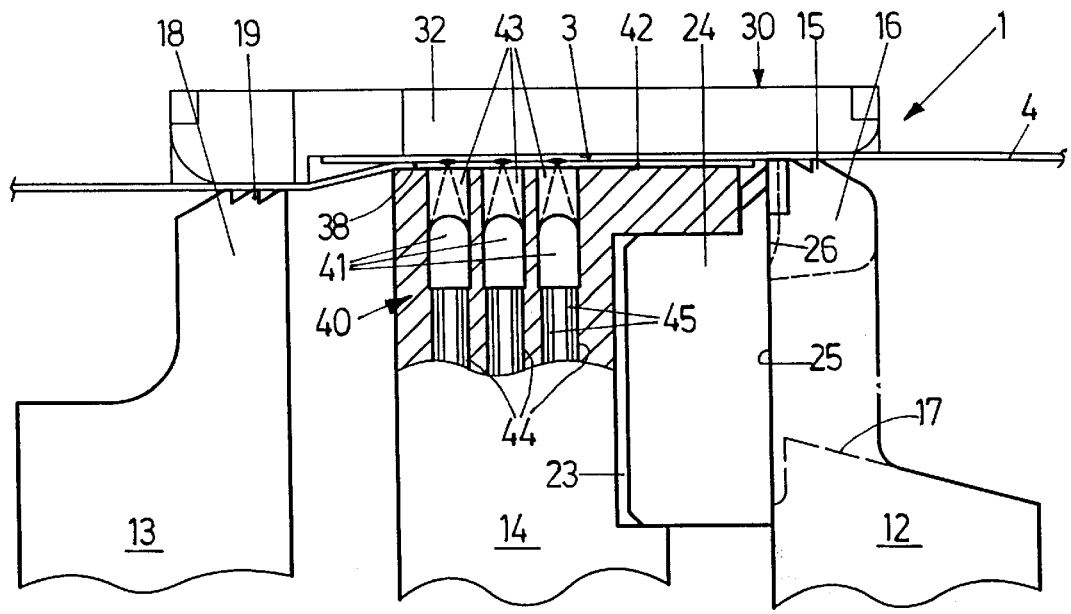
FIGS. 2 and 3 are lateral views of details of welding heads with two different embodiments of the laser welding device.

In the embodiment according to FIG. 2, the laser welding device 40 is formed by a number of laser diodes 41, which are positioned side by side in the central clamping jaw 14 and which are countersunk in bearing channels 43 by a certain distance of some millimeters underneath the clamping surface 42. These bearing channels 43 pass into passageways 44, in which run the electric leads 45 for the supply of energy to the laser diodes 41. These leads 45 are connected to a corresponding control unit (not shown) which controls the beam emission by the laser diodes 41.

As roughly outlined by dashes in FIG. 2, the laser diodes 41 have a converging radiation characteristic of a focus that corresponds approximately to the distance between the laser diodes 41 and the surface of contact between the two strap sections 3, 38. Given a corresponding strap material property that is transparent to the laser radiation or at least opaque, the laser energy is focused into the plane of contact between the two strap sections 3, 38, where the strap material warms up and starts melting, a welded joint forming between the two sections 3, 38 under the simultaneous pressure of the clamping jaw 14. The type, wavelength, energy density and radiation characteristic of the laser diodes must be selected, based on factual circumstances and in particular on the type and quality of the strap, and may vary widely. Correct selection can be determined by simple tests.

Figure 3:
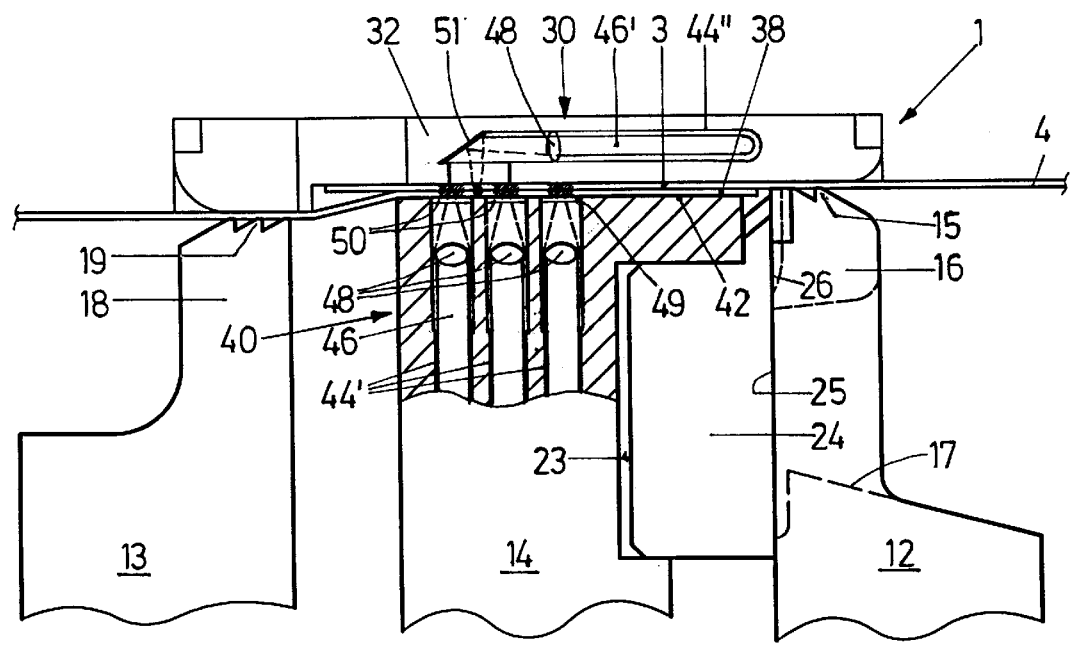

FIG. 3 illustrates another embodiment of the invention, in which the laser beams are not directly produced in the clamping jaw 14, but supplied via fiber-optical light guides 46 by a supply laser 47, which is diagrammatically outlined in FIG. 1. To this end, the light guides 46 enter the clamping jaw 14, passing via passageways 44' as far as before the clamping surface 42. At the ends of the light guides 46, focusing lenses 48 are provided as optical elements, focusing the laser beam that emerges from the respective light guide 46 onto the strap sections 3, 38 that are to be welded together. The focusing characteristic can be selected such that the focus obtained is not overly sharp, but that a focusing area is obtained instead, interspersing the volume of the looping strap, which is roughly outlined in FIG. 3 by the greater hatched areas in the two strap sections 3, 38.

FIG. 3 further illustrates that the orifices 49 of the passageways 44' are closed by respective transparent covers 50 so that dust, strap abrasion particles and the like are prevented from penetrating.

As roughly outlined in FIG. 3, possible additional laser radiation for the welding process can be put into practice by a laser beam being led in via the pressure plate 32. To this end, another light guide 46' runs in a passageway 44" in the pressure plate 32, suitable measures for deflecting the laser beam that emerges from the guide 46' into the plane of welding being provided in the form of deviation mirrors 51.

The mode of operation of all the mentioned designs of the welding head is briefly explained as follows:

With the clamping jaws 12, 13, 14 opened, a looping strap 4 is inserted through the welding head 1 and a following strap frame of a looping machine sufficiently far for the leading strap section 3 to arrive again in the welding head 1. The leading strap section 3 then takes the position seen in FIGS. 2 and 3. So as to fix the leading section 3 in this position, the right clamping jaw 12 is moved upwards, after which the looping strap 4 is withdrawn from the frame backwards through the welding head 1 for the strap 4 to encircle the to be looped product by a tight loop. In this condition the left clamping jaw 13 moves into the position seen in FIGS. 2 and 3, fixing the loop in the tightened position. Then the central clamping jaw 14 with the cutter bar 24 moves upwards, whereby the tail section 38 is cut off the supply of strap. Simultaneously, the clamping surface 42 of the clamping jaw 14 acts on the strap sections 3, 38 that are to be welded together, and the laser welding device 40 is activated at the same time. Light energy is fed into the sections 3, 38, which warm up, start melting and are welded together by the pressure of the clamping jaw 14 against the pressure plate 32. Then all the clamping jaws 13, 14 are moved downwards and the pressure plate 32 is moved to the side so that the welded loop of strap is released and the looped stack can be discharged.

What is claimed is:

1. A welding head for a looping machine comprising
    a bearing housing (2);
    several clamping jaws (12, 13, 14) for fixing and actuating a leading strap section (3) and a strap section (38) lapping there-over during withdrawal and welding of a looping strap (4);
    a pressure plate (32) on an upper side of the welding head (1), acting as a holder upon actuation of the leading strap section (3) and the strap section (38) lapping there-over during a welding job; and
    a welding device in the welding head (1) for welding together the leading strap section (3) and the strap section (38) lapping there-over;
wherein the welding device is a laser beam welding device (40) which, in the welding head (1), acts on the leading strap section (3) and the strap section (38) lapping there-over which are to be welded together.

2. A welding head according to claim 1, wherein the welding device (40) comprises at least one laser diode (41) which is disposed in at least one of the clamping jaws (12, 13, 14).

3. A welding head according to claim 2, wherein the laser diodes (41) are disposed in bearing channels (43) in the corresponding clamping jaw (14), the bearing channels (43) being open towards the leading strap section (3) and the strap section (38) lapping there-over which are to be welded together.

4. A welding head according to claim 1, wherein the laser welding device (40) is a supply laser (47) which is disposed outside the clamping jaws (12, 13, 14) and from which at least one fiber-optical light guide (46, 46') leads out for guidance of a laser beam to the leading strap section (3) and the strap section (38) lapping there-over which are to be welded together.

5. A welding head according to claim 1, wherein the laser welding device (40) comprises optical elements (48) for focusing the laser beam onto the leading strap section (3) and the strap section (38) lapping there-over which are to be welded together.

6. A welding head according to claim 2, wherein leads (45) of the laser diodes (41) are accommodated in a passageway (44) in the associated clamping jaw (14).

7. A welding head according to claim 4, wherein the light guides (46, 46') are accommodated in a passageway (44') in the associated clamping jaw (14).

8. A welding head according to claim 5, wherein the optical elements are lenses (48) in the end portion of a respective passageway (44').

9. A welding head at least according to claim 7, wherein an orifice (49) of the passageway (44') towards the leading strap section (3) and the strap section (38) lapping there-over, which are to be welded together, is closed by a transparent cover (50).

10. A welding head according to claim 1, wherein a laser beam is led via the pressure plate (32) to the leading strap section (3) and the strap section (38) lapping there-over which are to be welded together.

* * * * *